United States Patent
Pasquet

(10) Patent No.: US 8,628,301 B2
(45) Date of Patent: Jan. 14, 2014

(54) WIND TURBINE ROTOR

(75) Inventor: Pierre Pasquet, Alella (ES)

(73) Assignee: Alstom Wind S.L.U., Barcelona (ES)

( * ) Notice: Subject to any disclaimer, the term of this patent is extended or adjusted under 35 U.S.C. 154(b) by 0 days.

(21) Appl. No.: 13/812,489

(22) PCT Filed: Jul. 12, 2012

(86) PCT No.: PCT/EP2012/063653
§ 371 (c)(1),
(2), (4) Date: Jan. 25, 2013

(87) PCT Pub. No.: WO2013/007775
PCT Pub. Date: Jan. 17, 2013

(65) Prior Publication Data
US 2013/0136602 A1 May 30, 2013

Related U.S. Application Data

(60) Provisional application No. 61/534,028, filed on Sep. 13, 2011.

(30) Foreign Application Priority Data

Jul. 13, 2011 (EP) .................................... 11382235

(51) Int. Cl.
*F03D 7/02* (2006.01)

(52) U.S. Cl.
USPC .................... 416/155; 416/148; 416/210 R

(58) Field of Classification Search
USPC .............. 416/1, 147, 148, 155, 204 R, 210 R
See application file for complete search history.

(56) References Cited

U.S. PATENT DOCUMENTS

| 7,077,630 B2 * | 7/2006 | Wobben ........................ 416/155 |
| 7,335,128 B2 * | 2/2008 | Flamang et al. .............. 475/331 |
| 7,780,417 B2 | 8/2010 | Kirchner et al. |
| 8,246,312 B2 * | 8/2012 | Schubert ................... 416/244 R |
| 2008/0193295 A1 * | 8/2008 | Kirchner et al. .............. 416/205 |
| 2009/0087127 A1 | 4/2009 | Larsen et al. |
| 2009/0311104 A1 | 12/2009 | Steffensen |

FOREIGN PATENT DOCUMENTS

| DE | 20 2005007450 | 7/2005 |
| WO | WO 2007/003866 | 1/2007 |

OTHER PUBLICATIONS

"Shrink Fitting." Shrink Fitting. Alstern Technologies, Oct. 27, 2007. Web. May 10, 2013.*
International Search Report and Written Opinion for PCT/EP2012/063653, mailed Nov. 23, 2012, 10 pgs.

* cited by examiner

*Primary Examiner* — Nathaniel Wiehe
*Assistant Examiner* — Justin Seabe
(74) *Attorney, Agent, or Firm* — Squire Sanders (US) LLP

(57) ABSTRACT

Wind turbine rotor comprising a hub, a plurality of blades and at least one pitch system for rotating a blade substantially along its longitudinal axis, the pitch system comprising a motor, a drive pinion, a gear arranged to mesh with the drive pinion and a pitch bearing, the pitch bearing comprising an outer bearing ring connected to the hub, an inner bearing ring connected to a blade and, between these two bearing rings, one or more rows of rolling elements which allow both bearing rings to rotate relative to each other, wherein the inner bearing ring has an inner side, and wherein a reinforcement disc is radially fixed to the inner side of the inner bearing ring.

16 Claims, 7 Drawing Sheets

A - A

A - A

WIND TURBINE ROTOR

This application claims the benefit of European Patent Application EP 11382235.7 filed on Jul. 13, 2011 and U.S. Provisional Patent Application Ser. No 61/534,028 filed on Sep. 13, 2011.

The present invention relates to wind turbine rotors, and more particularly relates to wind turbine rotors comprising at least one electromechanical pitch mechanism. The invention further relates to a wind turbine comprising the same and to a method of manufacturing a pitch bearing for such wind turbine rotors.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

An important auxiliary system generally provided on wind turbines is the pitch system. Pitch systems are employed for adapting the position of a wind turbine blade to varying wind conditions. A pitch system normally comprises a slew bearing comprising an outer ring, an inner ring and, between these two rings, one or more rows of rolling elements which allow both rings to rotate relative to each other.

In some cases pitch bearings may further comprise a gear which meshes with a drive pinion. When gusts of wind impinge on a blade, the wind forces may act to substantially bend the blade. Such bending has an effect on the loads transmitted to the bearing. This way, some of the rolling elements of the bearing may carry larger loads than others, thus deforming the pitch bearing. The loads acting on the bearing may cause the linear contact and load transmission between the driven gear (crown) and the drive pinion to be shifted from its nominal position and the gear meshing (and the bearing) of such systems may thus suffer deformations.

One way to tackle such unevenly distributed loads would be to make the bearing larger in order to increase its stiffness and to limit its deformation. However, this would add weight and cost to the design.

Document U.S. Pat. No. 7,780,417 describes a stiffening element provided between the rotor blade and the pitch bearing, connected to the same via joining means. But this kind of solution can be rather complicated and expensive.

Thus, there still exists a need to provide a robust electromechanical pitch bearing which reduces its deformations during operation of the wind turbine and is cost-effective.

SUMMARY OF THE INVENTION

In a first aspect, a wind turbine rotor is provided that comprises a hub, a plurality of blades and at least one pitch system for rotating a blade substantially along its longitudinal axis. The pitch system comprises a motor, a drive pinion, a gear arranged to mesh with the drive pinion and a pitch bearing. The pitch bearing comprises an outer bearing ring connected to the hub, an inner bearing ring connected to a blade and, between these two bearing rings, one or more rows of rolling elements which allow both bearing rings to rotate relative to each other, wherein the inner bearing ring has an inner side, and wherein a reinforcement disc is radially fixed to the inner side of the inner bearing ring.

According to this aspect, the pitch bearing comprises a reinforcement, which may be radially fixed to the inner side of the inner bearing ring thus increasing the radial stiffness of the bearing on the bearing ring on which the blade is fixed. At the same time, such a reinforcement enhances the stiffness of the connection between the blade and the bearing. The stiffness conferred by this reinforcement favours a proper contact between rolling elements and raceways machined in the bearing's rings. The reinforcement disc may thus improve the reliability and durability of an electromechanical pitch bearing.

In some embodiments, an outer diameter of the reinforcement disc may be slightly bigger than an inner diameter of the inner bearing ring such that the reinforcement disc and the inner bearing ring can be shrink-fitted. This way, once assembled, the reinforcement disc and the inner bearing ring cannot be separated, forming a substantially integral piece.

In such a substantially integral piece, the reinforcement disc may absorb internal tensions and may transform them into a homogeneous tension distributed all through its surface. The reinforcement disc may thus allow different gear designs without distorting the loads acting on the bearing, i.e. avoiding deformation of the bearing.

In some embodiments, the reinforcement disc may be made of a different material than that of the inner and outer bearing rings, for example a cheaper material. The reinforced bearing may thus be cost-effective.

In some embodiments, the gear may cover substantially the whole inner or outer side of the inner or outer bearing ring. In others, it may cover a portion of the inner or outer side of the inner or outer bearing ring. This may substantially reduce the amount of gear material used.

In some embodiments, the gear or gear portions may be axially screwed to the reinforcement disc. This way, if necessary, the gear or gear portions may be easily repaired and/or replaced. Further, such axial screwing may be easily accessible from an inside portion of the hub.

In some embodiments, the pitch system may further comprise a lubrication system comprising at least one lubricant feeder and/or at least one lubricant collector arranged on the reinforcement disc. This way, the components of the lubrication system can be arranged inside the blade root or the hub which are substantially closed areas. Thus, there is no need for an additional cover or any other protection means.

Another aspect relates to a wind turbine comprising a wind turbine rotor substantially as hereinbefore described.

A further aspect relates to a method of manufacturing a pitch bearing for a wind turbine rotor substantially as hereinbefore described.

In some embodiments, the method may comprise:
heating the inner bearing ring,
arranging the reinforcement disc on the inner side of the inner bearing ring, and
cooling the inner bearing ring with the reinforcement disc arranged within it.

In others, it may comprise:
cryogenically treating the reinforcement disc, and
arranging the reinforcement disc on the inner side of the inner bearing ring.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
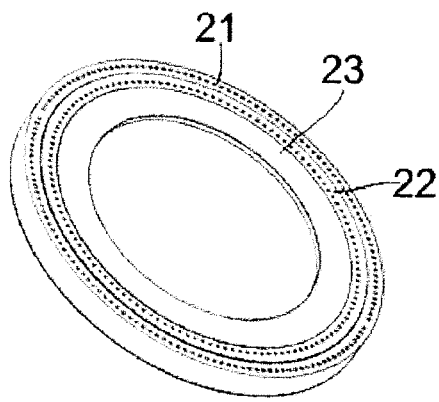
FIGS. 1 and 2 show two different perspective views of the same embodiment.
Figure 2:
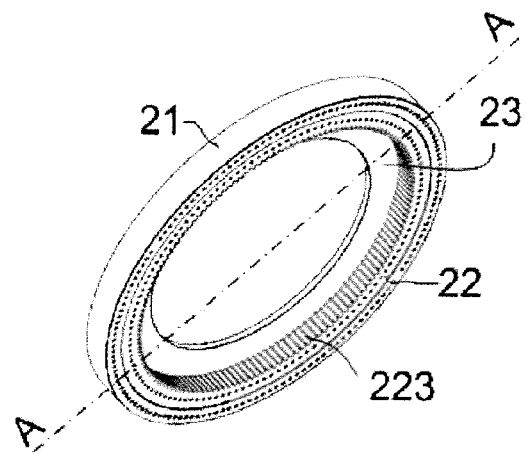

FIG. 1 shows a perspective top view, of a bearing according to a first embodiment. FIG. 2 shows a perspective bottom view of the same embodiment.

The bearing may comprise an outer bearing ring 21, an inner bearing ring 22 having an inner side (reference 222 of FIG. 5) and, between these two bearing rings, one or more rows of rolling elements (see also FIGS. 4 and 5) which may allow both bearing rings to rotate relative to each other. The bearing may further comprise a gear 223 which may mesh with a drive pinion of a drive motor (neither shown). Further, a reinforcement ring 23 may be radially fixed to the inner side of the inner bearing ring 22.

In an alternative embodiment the reinforcement ring may be a circular disc. In such cases the disc may comprise a central opening connecting an inside portion of the blade root with an inside portion of the hub.

FIG. 2 shows an embodiment wherein the gear 223 may cover the whole inner side of the inner bearing ring 22. In this embodiment the gear 223 may be machined in the inner side of the inner bearing ring 22.

Figure 3:
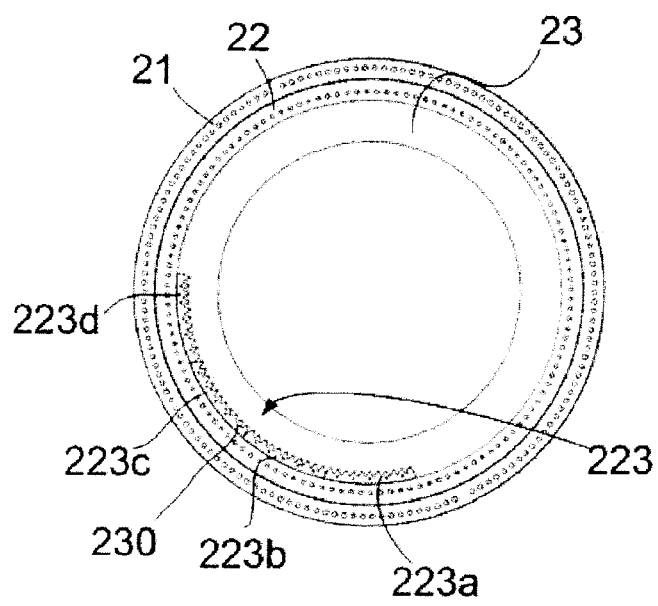
FIG. 3 shows a bottom view of another embodiment.

FIG. 3 shows a bottom view of a bearing wherein the gear 223 may cover only a portion of the inner side of the inner bearing ring 22. As shown in FIG. 3, the gear 223 may be made from a plurality of annular segments 223a-223d. These segments 223a-223d may be axially screwed to the reinforcement ring 23 by fastening means such as screws or bolts 230. These bolts 230 may be placed in the portion of the gear having more material, which may be the portion close to the root of each tooth of the gear.

Further, the segments 223a-223d may be concentric. In some embodiments, the segments 223a-223d may have different arc widths; in others they may be symmetrical.

In the example of FIG. 3, the maximum angle of travel for the mechanical mesh between the gear (formed by the segments 223a-223d) and the driving pinion (not shown) may be substantially 110° which may generally be enough for all pitching purposes. In most wind turbines, there is an angle of approximately 90° between the minimum and maximum pitch positions.

Thus, a gear design as shown in FIG. 3 entails economical cost reductions in the amount of gear material used and in terms of repair or replacement of a damaged toothing portion. The reinforcement ring may ensure the proper working conditions of the different gear designs as it enables a homogeneous distribution of loads, thus avoiding deformation of the bearing.

In general, the reinforcement ring 23 may be made of a different material than that of the inner 22 and outer 21 bearing rings. A typical material for the inner and outer bearing ring may be a high grade steel, e.g. 42CrMo4. The reinforcement ring may be made with a cheaper material such as a high-strength low-alloy, e.g. structural steel S355. The reinforcement ring may be added during the manufacturing process of the inner bearing ring. Thus this extra part may belong to the bearing as an area of its final geometry.

Figure 4:
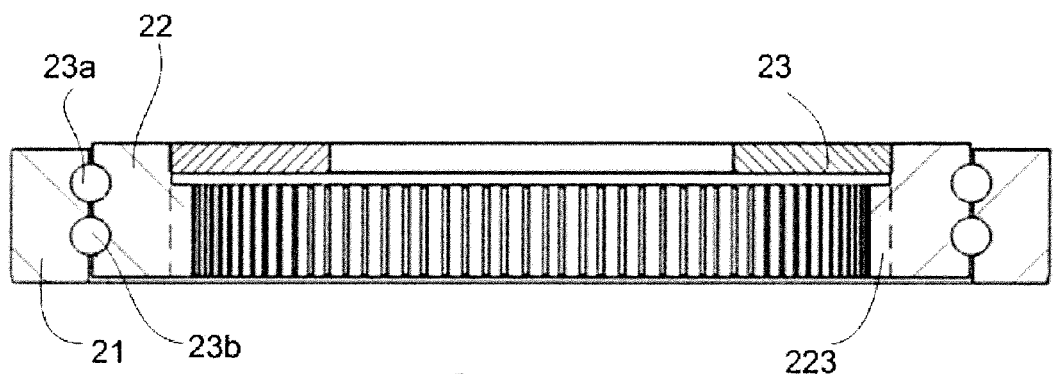
FIG. 4 shows a cross-sectional view along line A-A of FIG. 2.

FIG. 4 shows a cross-sectional view of FIG. 2 wherein the gear 223 may be machined in the inner bearing ring 22. Two rows of rolling elements 23a, 23b may be arranged between the inner 22 and outer 21 bearing rings and may allow both bearing rings to rotate relative to each other.

Figure 5:
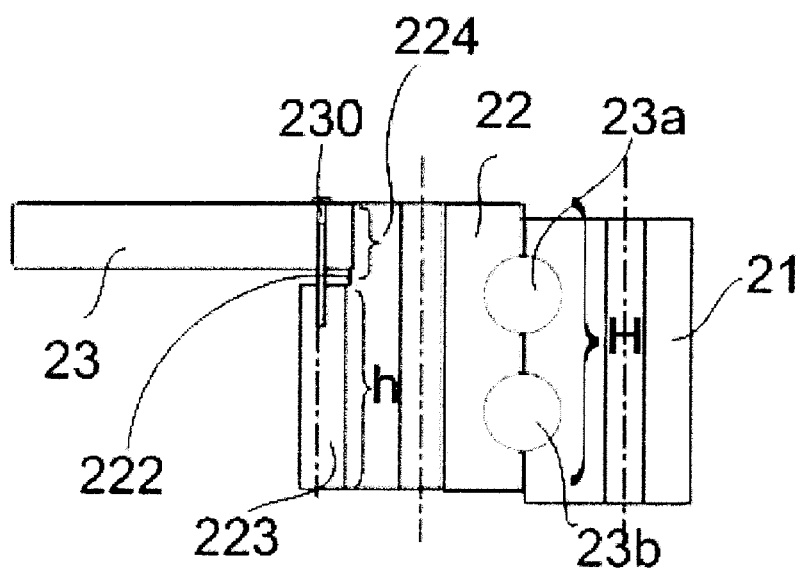
FIG. 5 shows a partial cross-section of the embodiment shown in FIG. 3.

FIG. 5 shows a partial cross-section of FIG. 3. This figure shows an embodiment wherein the gear 223 may be axially fixed to the reinforcement ring 23 by means of fastening means such as screws or bolts 230.

In general, the gear 223 may have a height h in an axial direction which may be smaller than a height H of the inner bearing ring 22 such that a gearless portion 224 may be defined on the inner side 222 of the inner bearing ring 22. This way, the reinforcement ring 23 may be radially fixed to said gearless portion 224.

A further aspect relates to a method of manufacturing a pitch bearing for a wind turbine rotor substantially as hereinbefore described. The method may be based on shrink-fitting techniques. In order to carry out said method, an outer diameter of the reinforcement disc may be made slightly bigger than an inner diameter of the inner bearing ring. The inner bearing ring may be heated up to a temperature in which the inner bearing ring expands. Such temperature may vary depending upon the material or alloy used for the bearing rings. Then, the reinforcement ring may be arranged on the inner side of the inner bearing ring, e.g. using a press. The contact area at the joint between the heated inner bearing ring and the reinforcement ring that is at a lower temperature may decrease the temperature of the inner bearing ring thus reducing its expanded diameter. The stiffness of the joint reinforcement ring-inner bearing ring may increase as both pieces reach the same temperature. Such a joint may prevent any relative movement between them. This way, the final inner bearing ring may present two different materials which are fully interdependent as if the bearing ring would have been made from the same raw part.

In alternative embodiments, the reinforcement ring may be cryogenically treated. Once the reinforcement ring is cryogenically treated, the reinforcement ring may be arranged on the inner side of the inner bearing ring which may be previously heated or not. Thus the contact area at the joint between the cooled reinforcement ring and the inner side of the inner bearing ring that is at a higher temperature may warm up the reinforcement ring until both pieces reach the same temperature. As mentioned before, the stiffness of the joint reinforcement ring-inner bearing ring may increase as both pieces reach the same temperature. And the final inner bearing ring may present two different materials which are fully interdependent substantially as explained above.

In some embodiments, such a cryogenical treatment of the reinforcement ring may be carried out by means of a blanket of nitrogen arranged around the reinforcement ring. The arrangement of the cooled reinforcement ring on the inner side of the inner bearing ring may be carried out using a press.

Once the set inner bearing ring-reinforcement ring has been manufactured there may be different possibilities for completing the bearing manufacture, depending on the type of gear.

If the initial inner bearing ring already comprises a gear machined on its inner side a final machining of the set inner bearing ring-reinforcement ring may be carried out. This final machining may be performed on the complete inner bearing ring, the gear, the raceways and the upper surface of the inner bearing ring with the reinforcement ring, in order to ensure the flatness of said upper surface. This way, said upper surface can be used as a mounting surface for a blade root.

If the initial inner bearing ring does not comprise a gear yet, but the design of the bearing is such that the gear is provided on the inner bearing ring, then the gear or gear portions may be axially screwed to the reinforcement ring using fastening means such as bolts (as shown in FIG. 5).

The last step is to assemble the outer bearing ring.

In those embodiments having a gear provided on the outer bearing ring, the gear may be first mounted or machined on the outer bearing ring and then assembled with a set reinforcement ring-inner bearing ring substantially as hereinbefore described.

A further aspect of an inner reinforcement disc substantially as hereinbefore described is that it may bring the possibility of arranging other systems or components such as lubrication components or pitch retention system components on it.

FIGS. 6a-7b show examples of components of a lubrication system arranged on the reinforcement disc.

Figure 6A:
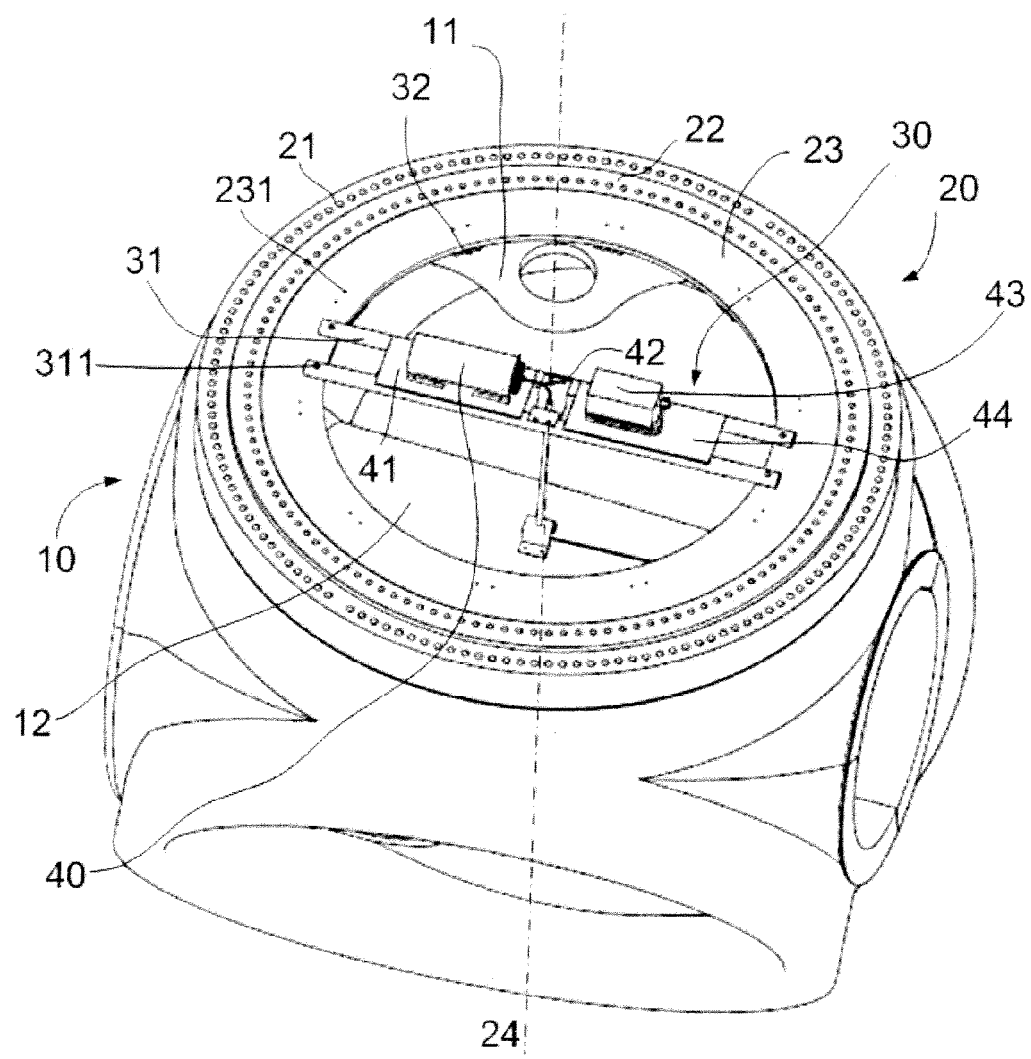
FIGS. 6a-6b show a further embodiment.

FIG. 6a shows a wind turbine rotor that may comprise a hub 10 to which a plurality of blades (not shown) may be rotatably attached. A pitch mechanism may be provided for rotating each blade along its longitudinal axis. The pitch mechanism may comprise a pitch bearing 20. The pitch bearing 20 may comprise an outer bearing ring 21 connected with the hub 10 and an inner bearing ring 22 connected with a blade (not shown). The hub 10 may comprise a flange 11 for mounting a drive pinion of a drive motor (neither shown). In some embodiments, the flange may form an integral piece with the hub. In others it may be a separate piece fixed to the hub by welding or by fastening means such as screws, bolts or similar. Further, a reinforcement ring 23 may be radially fixed to an inner side (reference 222 of FIG. 5) of the inner bearing ring 22.

The reinforcement ring 23 may be provided with through-bores 231 arranged axially. Lubricant injectors 32 may be fixed to the reinforcement ring 23, e.g. using screws, bolts, clamps or any other suitable fastening means in combination with said through-bores 231.

Further, a supporting arrangement 30 for supporting lubrication components may be fixed to the reinforcement ring 23 in such a manner that the supporting arrangement 30 traverses a pitch bearing rotational axis 24. The supporting arrangement 30 may comprise two substantially parallel beams 31. Each beam 31 may be fixed to the reinforcement ring 23 by screws, bolts 311 or similar, e.g. one bolt at each end. In alternative embodiments, the supporting arrangement may comprise a beam diametrically fixed to the reinforcement ring. In yet further embodiments, the supporting arrangement may be directly fixed to the inner side of the inner bearing ring.

Such a supporting arrangement 30 may support a lubrication pump 40. In some cases, the pump 40 may be mounted on a platform 41 provided on the beams 31. The pump 40 may be arranged in such a manner that its central line 42 may run along the bearing rotational axis 24, from the pump 40 to a front frame 12 on which the hub 10 may be rotatably mounted. And from said front frame, the central line may continue towards a general electric system housed inside the nacelle (not shown). This way, it may not be affected by a pitch movement of the blade, i.e. the central line will not get tangled up with other components. The pump 40 can be used e.g. to pump lubricant through the lubricant injectors 32 into a feed line through inlets (not shown) arranged on an inner side (reference 222 of FIG. 5) of the inner bearing ring 22.

In the embodiment shown in FIG. 6a a lubricant deposit 43 may further be arranged on the supporting arrangement 30. In some cases, the lubricant deposit 43 may be mounted on a platform 44 provided on the beams 31. The lubricant deposit 43 can be used, e.g., to store old lubricant recovered from inside the bearing. Such a lubricant recovery may need a recovery circuit and lubricant extractors (reference 33a of FIG. 6b). In alternative embodiments, the lubricant deposit may be part of the pump assembly.

Figure 6B:
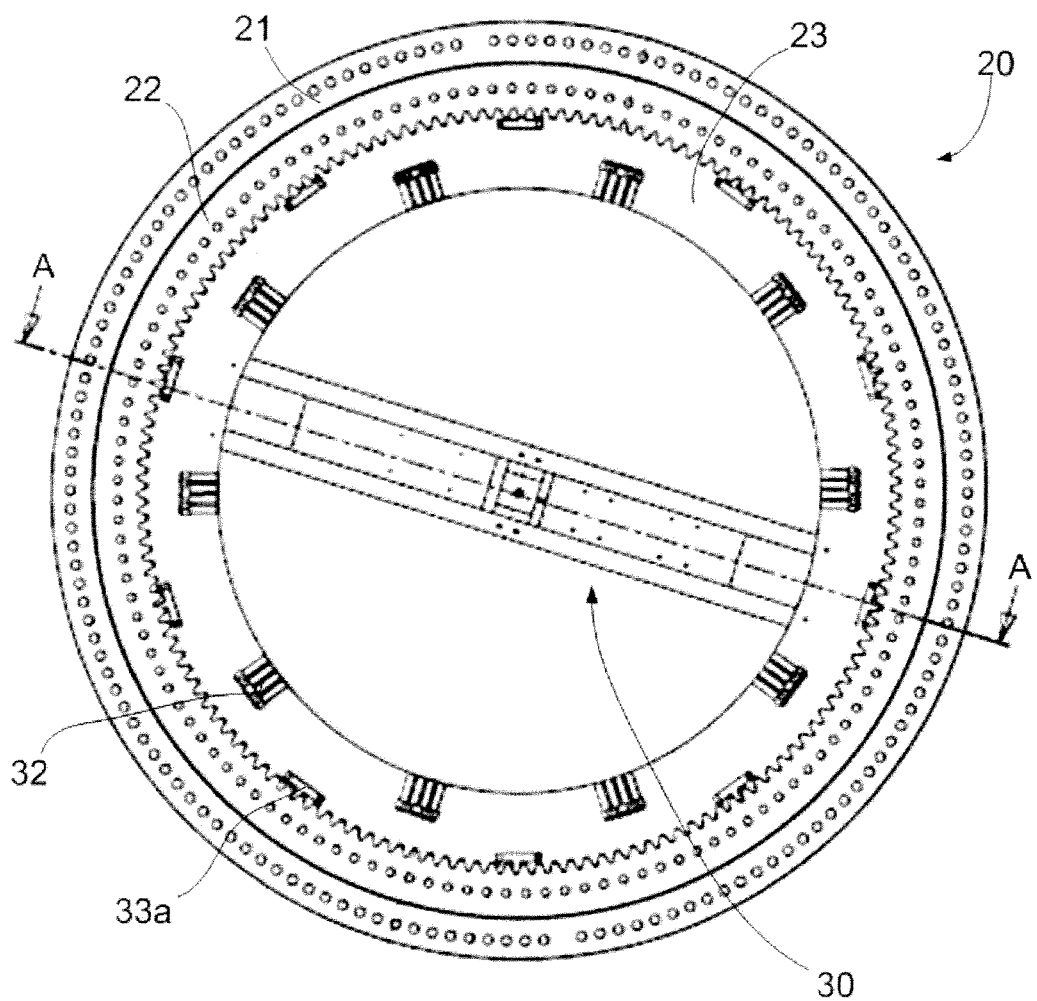

FIG. 6b shows a rear view of FIG. 6a, wherein the hub and the flange for mounting the drive pinion have been deleted. In FIG. 6b the lubricant injectors 32 and the lubricant extractors 33a may be fixed to he reinforcement ring 23.

This way, the components of the lubrication circuit may all be arranged inside the blade root which ensures appropriate protection against corrosion. Furthermore, in case of wind turbines equipped with a temperature and humidity control inside the hub, e.g. for cold climates or desert climates, all the components housed inside the blade root may further be protected from extreme temperatures and humidity. These arrangements may also be suitable for offshore wind farms as no high salt content or humid air can come into contact with these components arranged inside the blade root.

Figure 7A:
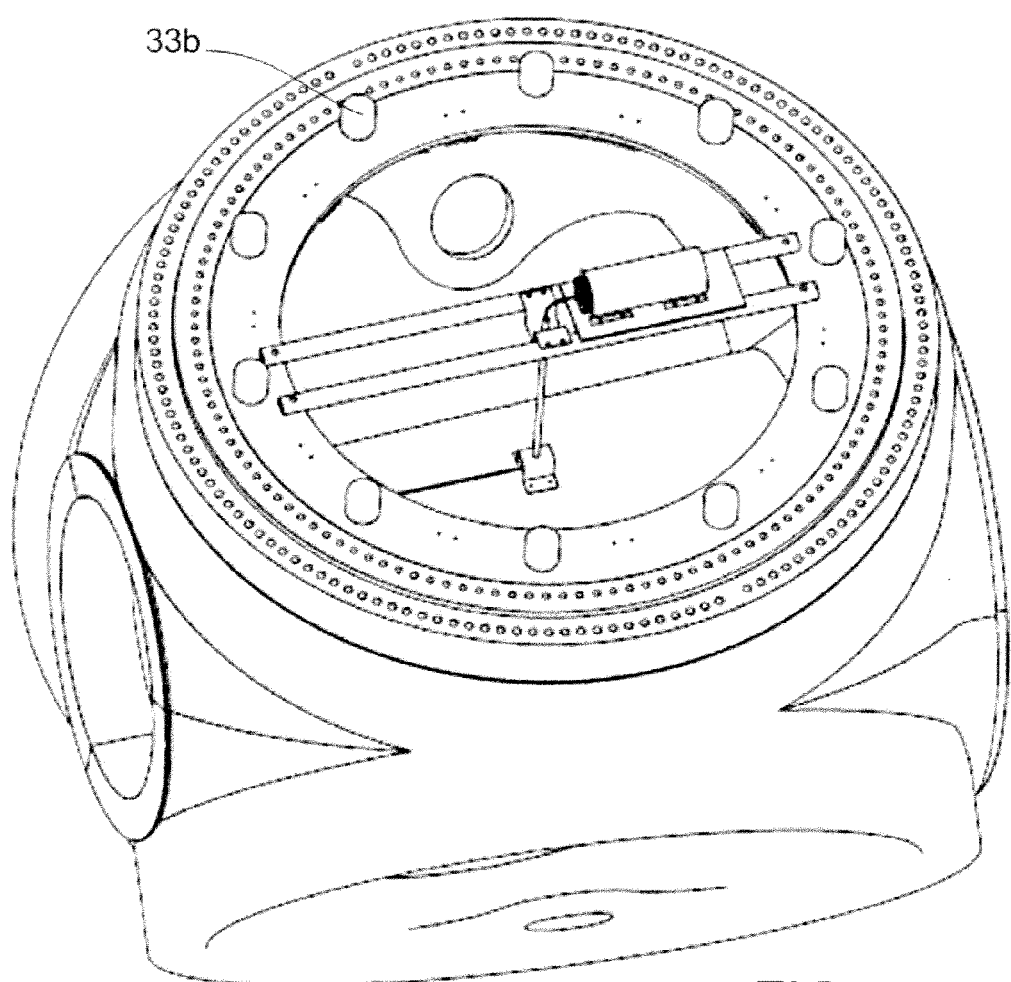
FIGS. 7a-7b show yet further embodiments.

FIG. 7a shows another embodiment. The main difference with the embodiment shown in FIGS. 6a-6b is that the lubricant extractors and lubricant deposit have been replaced by lubricant collectors 33b such as bottles. The use of collectors or bottles is cheaper than the use of extractors, but the manual operation of emptying the bottles may be cumbersome as each bottle has to be emptied separately.

Figure 7B:
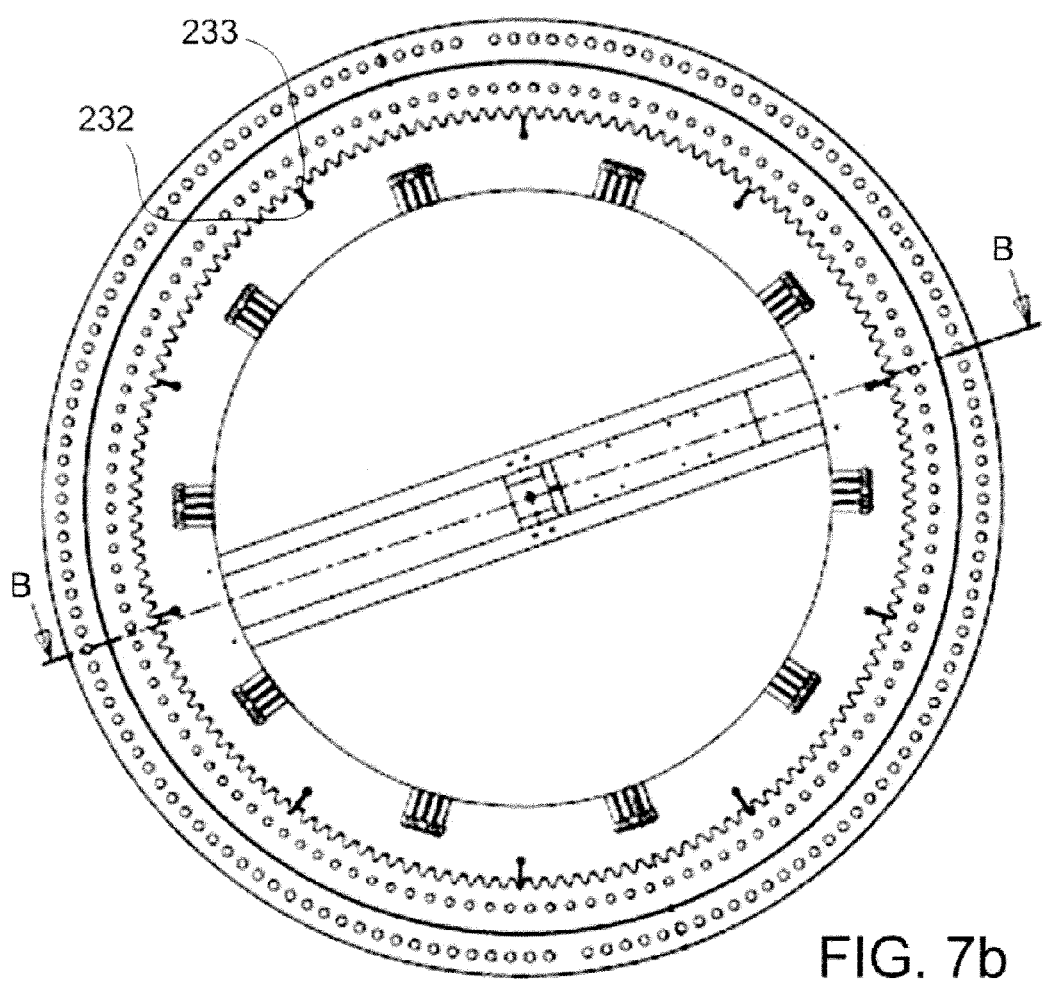

FIG. 7b shows a rear view of FIG. 7a, wherein the hub and the flange for mounting the drive pinion have been deleted. The reinforcement ring 23 may be provided with a first set of axial through-bores (reference 231 of FIG. 6a) and a second set of axial through-bores 232. Lubricant injectors 32 may be screwed to the reinforcement ring 23 by means of the first set of through-bores (reference 231 of FIG. 6a) and the lubricant collectors or bottles 33b may be fixed to the reinforcement ring 23 by the second set of through-bores 232. A tube 233 may connect each outlet (not shown) with a lubricant collector or bottle (reference 33b of FIG. 7a).

Figure 8:
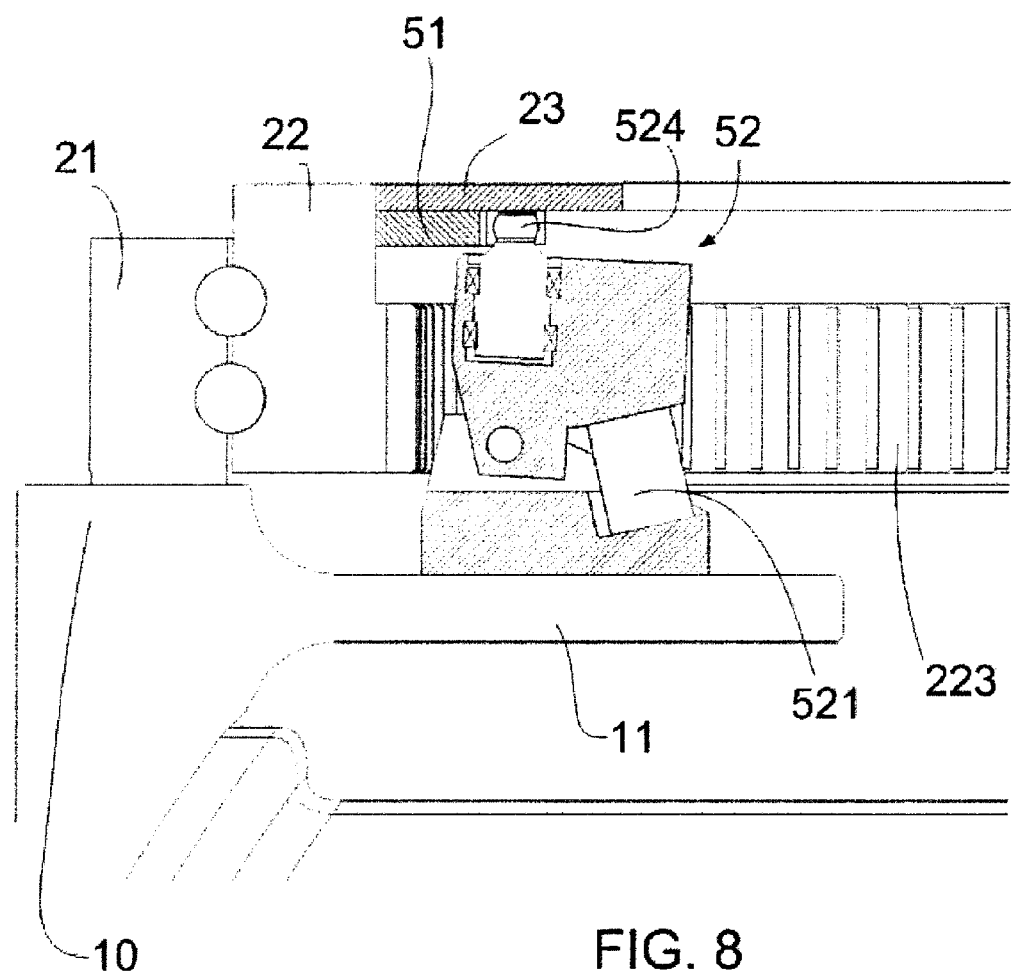
FIG. 8 shows a cross-section of another embodiment.

FIG. 8 shows components of a pitch retention system mounted on the reinforcement ring 23. The pitch retention system may comprise a cam profile 51 and a cam follower 52. The cam follower 52 may comprise a pushing member 521 and a contact member 524. The pushing member 521 may be arranged to push the contact member 524 towards the cam profile 51 and the cam profile 51 may comprise a local depression (not shown). The cam follower 52 and the cam profile 51 may be arranged in such a way that when the blade is in a pitch position at or below nominal wind speed, the contact member 524 can be retained in said local depression. In such cases, the cam profile 51 may be mounted on the reinforcement ring 23 fixed to the inner bearing ring 22. The cam profile may be screwed, glued or welded to the reinforcement ring. In some embodiments, the cam profile may be fixed to the bearing ring, e.g. through an adapter comprising a plurality of holes to facilitate its attachment with bolts or similar.

The provision of such a pitch retention system may be beneficial in reducing the wear of the teeth of an electromechanical pitch system by providing a retention torque in the pitch position that is assumed below or at nominal wind speed.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine rotor comprising a hub, a plurality of blades and at least one pitch system for rotating a blade substantially along its longitudinal axis, the pitch system comprising a motor, a drive pinion, a gear arranged to mesh with the drive pinion and a pitch bearing, the pitch bearing comprising an outer bearing ring connected to the hub, an inner bearing ring connected to a blade and, between these two bearing rings, one or more rows of rolling elements which allow both bearing rings to rotate relative to each other, wherein the inner bearing ring has an inner side, and wherein a reinforcement disc is radially fixed to the inner side of the inner bearing ring, and wherein an outer diameter of the reinforcement disc is slightly bigger than an inner diameter of the inner bearing ring, and wherein the reinforcement disc and the inner bearing ring are shrink-fitted.

2. A wind turbine rotor according to claim 1, wherein the reinforcement disc is made of a different material than that of the inner and outer bearing rings.

3. A wind turbine rotor according to claim 1, wherein the reinforcement disc is an annular disc.

4. A wind turbine rotor according to claim 1, wherein the gear covers substantially the whole inner side of the inner bearing ring or the whole outer side of the outer bearing ring.

5. A wind turbine rotor according to claim 1, wherein the gear covers a portion of the inner side of the inner bearing ring or a portion of the outer side of the outer bearing ring.

6. A wind turbine rotor according to claim 1, wherein the gear is made from a plurality of arc segments.

7. A wind turbine rotor according to claim 1, wherein the gear is provided on the inner bearing ring and a height of the gear in an axial direction is smaller than a height of the inner bearing ring such that a gearless portion is defined on the inner side of the inner bearing ring and the reinforcement disc is radially fixed to said gearless portion.

8. A wind turbine rotor according to claim 7, wherein the gear is axially screwed to the reinforcement disc.

9. A wind turbine rotor according to claim 1, wherein the pitch system further comprises a lubrication system comprising at least one lubricant feeder and/or at least one lubricant collector arranged on the reinforcement disc.

10. A wind turbine comprising a wind turbine rotor according to claim 1.

11. A method of manufacturing a pitch bearing for a wind turbine rotor, the pitch bearing comprising an outer bearing ring, an inner bearing ring and, between these two bearing rings, one or more rows of rolling elements which allow both bearing rings to rotate relative to each other, wherein the inner bearing ring has an inner side, the method comprises:
heating the inner bearing ring,
arranging a reinforcement ring on the inner side of the inner bearing ring, the reinforcement ring having an outer diameter slightly bigger than an inner diameter of the inner bearing ring prior to heating the inner bearing ring, and
cooling the inner bearing ring with the reinforcement ring arranged within it, thereby radially fixing the reinforcement ring to the inner side of the inner bearing ring.

12. A method according to claim 11, further comprising the step of final machining or fixing a gear on the reinforcement ring and assembling the outer bearing ring.

13. A method according to claim 11, further comprising the step of machining or fixing a gear on the outer bearing ring and assembling the outer bearing ring to the inner bearing ring and reinforcement ring.

14. A method of manufacturing a pitch bearing for a wind turbine rotor, the pitch bearing comprising an outer bearing ring, an inner bearing ring and, between these two bearing rings, one or more rows of rolling elements which allow both bearing rings to rotate relative to each other, wherein the inner bearing ring has an inner side, the method comprises:
cryogenically treating a reinforcement ring, the reinforcement ring having an outer diameter slightly bigger than an inner diameter of the inner bearing ring prior to heating the inner bearing ring, and
arranging the reinforcement ring on the inner side of the inner bearing ring, wherein the reinforcement disc is radially fixed to the inner side of the inner bearing ring.

15. A method according to claim 14, further comprising the step of final machining or fixing of a gear on the reinforcement ring and assembling the outer bearing ring.

16. A method according to claim 14, further comprising the step of machining or fixing a gear on the outer bearing ring and assembling the outer bearing ring to the inner bearing ring and reinforcement ring.

* * * * *